United States Patent [19]
Dressler

[11] 3,842,686
[45] Oct. 22, 1974

[54] FLOATING-NUT MOUNTING

[75] Inventor: Bruno Dressler, Billancourt, France

[73] Assignee: Regie Nationale des Usines Renault, Billancourt (Hauts de Seine), France

[22] Filed: Feb. 23, 1973

[21] Appl. No.: 335,174

[30] Foreign Application Priority Data
Mar. 7, 1972  France .................. 72.07847

[52] U.S. Cl. ............ 74/424.8 A, 64/15 B, 267/181, 308/2 A, 74/459
[51] Int. Cl. ............................................. F16h 1/18
[58] Field of Search ........ 74/459, 424.8 A; 64/15 B, 64/15 R, 6; 267/181; 308/2 A

[56] References Cited
UNITED STATES PATENTS

| | | | |
|---|---|---|---|
| 3,170,337 | 2/1965 | Linley | 74/459 |
| 3,288,541 | 11/1966 | Tracy | 64/15 B |
| 3,394,970 | 7/1968 | Tracy | 64/15 B |
| 3,533,431 | 10/1970 | Kuenzel | 267/181 X |

FOREIGN PATENTS OR APPLICATIONS
247,730  0/1969  U.S.S.R. .................. 74/459

Primary Examiner—Samuel Scott
Assistant Examiner—Randall Heald
Attorney, Agent, or Firm—Stevens, Davis, Miller & Mosher

[57] ABSTRACT

A floating nut mounting for a screw and nut mechanism controlling the movements of a machine tool element or the like including a nut-containing case connected to the element via a concentric tubular member formed with two spaced sets of four transverse each opposed by pairs in parallel adjacent planes, the slots being directed at right angles from one plane to the other so as to form between these planes two pivot ring portions acting as flexible couplings, the case being secured to one end of the tubular member having its other end secured to the element.

6 Claims, 2 Drawing Figures

FLOATING-NUT MOUNTING

The present invention relates to the mounting of floating nuts for controlling by means of a screw shaft or leading-screw the movements of translation of machine tool members, this mounting being applicable more particularly to control mechanisms without play such as leading-screw and nut mechanisms wherein the nut consists essentially of a screw-threaded roller bearing, as used notably in digit-controlled machine tools.

Screw-and-nut transmissions of the bearing and play take-up type are used in digit-controlled machine tools on account of their absence of noxious play and their considerable axial rigidity. However, their high radial rigidity is such that even a minor misalignment between the bearings of the screw and nut involves considerable radial stress when the nut approaches a screw bearing. This stress is highly detrimental to the precision of the movement controlled through this mechanism, since it may reduce considerably the useful life of the screw and nut system while remaining uncontrollable, in the assembled condition of the various component elements of the mechanism, and may even cause jamming or locking effects by wedging.

Up to now, this inconvenience was coped with either by effecting a long and expensive adjustment ensuring a perfect alignment of the screw and nut axes, or by providing a control or driving screw having a length sufficient to enable its elastic deformation to absorb possible misalignments between the screw and nut, this last solution being attended however by the inconvenience that the nut cannot approach the screw mounting bearings by less than a predetermined distance which is the distance necessary to permit the elastic deformation of said screw.

With the nut mounting according to this invention the above-mentioned inconvenience is safely avoided in that the nut is allowed to "float" in a plane perpendicular to the screw axis while the complete and strict absence of any axial play is obtained for example through the use of the play take-up device associated with the threaded roller nut.

This particular nut mounting is characterized in that the case containing or enclosing the nut is connected to the member driven thereby via a concentric tubular member in which two spaced sets of four transverse slots opposed by pairs in adjacent planes and directed at right angles from one plane to another provide ring portions between said slot planes which constitute two flexible couplings of the elastic deformation type, said case being secured to one end of said tubular member having its opposite end secured to said driven member.

Moreover, according to a specific form of embodiment, the longitudinal flexibility of this slotted structure is compensated by applying to said tubular member a certain prestress greater than the reaction efforts of the member to be driven, with the assistance of a "floating" stop member mounted in said tubular member, between this tubular member and the nut case.

According to another form of embodiment, the axial stiffness of the device may be further increased by providing on either side of the nut case a pair of stop members, one engaging the interior of said tubular member and the other said nut-driven member.

A typical form of embodiment of a floating nut mounting according to this invention will now be described by way of example with reference to the attached drawing, in which.

Figure 1:
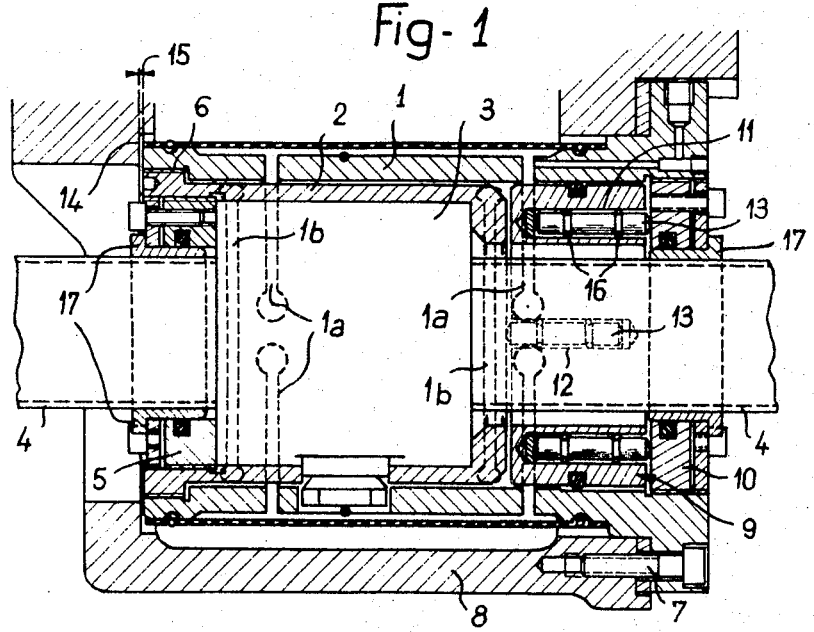
FIG. 1 is an axial longitudinal section of this mounting.

The floating-nut mounting support illustrated in FIG. 1 comprises essentially a tubular body 1 receiving a hollow case 2 containing the nut 3 and secured to the machine element to be driven, as will be explained presently.

This body 1 has formed therein two spaced sets of four slots each, comprising two opposite slots 1a and two adjacent opposite slots 1b shifted by 90° to the first slots 1a, these two sets of slots thus dividing somewhat the body 1 into three rigid elements resiliently interconnected by the flexible ring portions left between said slots. These ring portions act as flexible couplings and provide under these conditions two pivot points located on the axis of screw 4. The case 2 containing the nut 3 prestressed by a hollow screw 5 is secured while being centered to one of the end elements of said body 1, for example by means of a cemented screw-threaded portion 6. The body 1 is secured through its other end element by means of screws 7 to the machine element 8 to be driven. This case 2, by virtue of the double flexible coupling connecting same to the machine member 8, affords a certain radial translation as well as a certain rotational motion along axes perpendicular to the screw axis.

The aforesaid flexible ring portions formed by said slots have a certain axial elasticity. The axial rigidity of the mounting is obtained in this example by prestressing the case 2 against a floating stop or abutment member designated in general by the reference numeral 9 and bearing against a hollow adjustment screw 10 engaging an internally screw-threaded portion of said body 1.

The floating stop member 9 consists of a ring provided on either side with a pair of diametrically opposite blind holes shifted by 90° in relation to the holes of the opposite face. These holes designated by the reference numeral 11 on one side and 12 on the other side are engaged with play by studs 13 having part-spherical ends and a diameter corresponding substantially to the length of each stud, these studs 13 acting as bearing points and also as means permitting a rolling pivotal engagement; these studs 13 will thus impart to the stop member 9 to twofold function of bearing washer and of flexible-coupling and bearing ring, so as to absorb both the movements of translation and the oscillations of the nut case 2 while preserving a high degree of axial rigidity.

The floating stop member 9 is prestressed by means of the hollow screw 10 through the axial distortion of the connecting ring portions of body 1 which act as spring means. The longitudinal distortion of said body 1 is limited, in case of overload, by a shoulder 14 of the machine element 8 providing a clearance 15.

The bearing studs 13 of stop member 9 may be positioned centrally of their cavities by O-rings 16 for example of synthetic rubber, in order to reduce the jamming effects in an end position as well as the resistance to transverse movements.

Figure 2:
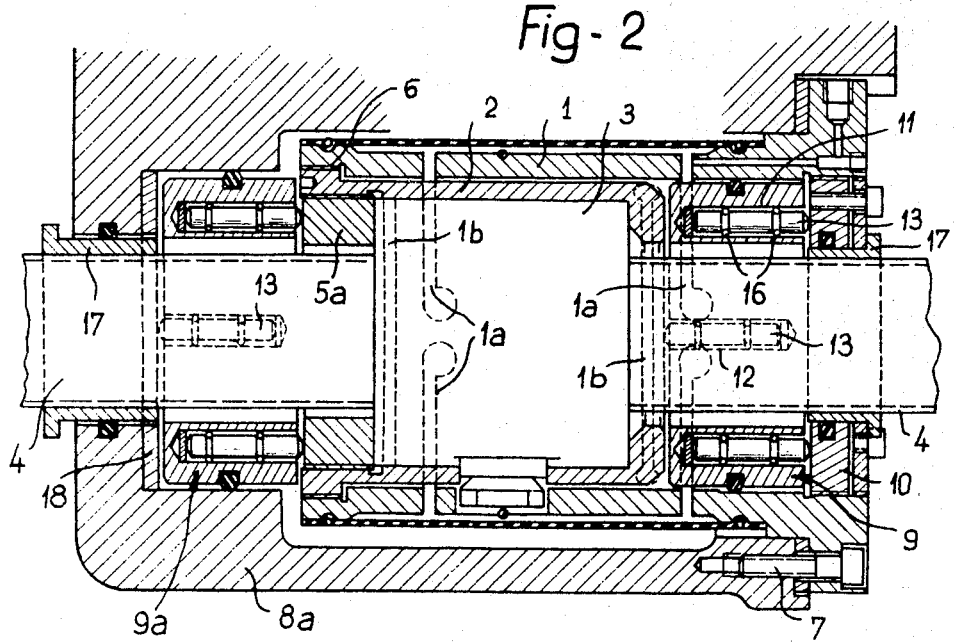
FIG. 2 is a similar view of a modified form of embodiment of this nut mounting.

According to a modified form of embodiment of this invention shown in FIG. 2 the stop member 9 is prestressed not by the elastic ring portions of body 1 which act as spring means, but by an antagonistic stop member 9a of the same type disposed on the other side of the case 2 and reacting between the hollow nut 5a and a plate 18 constituting an insert in a soulder of the machine member 8a. The degree of prestress is adjusted likewise by means of a hollow or ring screw 10. In this modified form of embodiment the axial rigidity of the assembly is doubled and the rated loads are considerably higher.

The floating nut support according to this invention permits misalignments between the screw bearings in relation to the theoretical path of the nut for machine tool control systems utilizing screw and nut systems of the bearing type free of play. The machining tolerances may be less strict and the assembling is simipified while preserving the maximum degree of precision in a screw and nut transmission and eliminating the risks of producing excessive radial stress, yet by resorting to a simple construction, without any expensive adjustments, while ensuring a perfect floatability of the nut through the double flexible coupling thus obtained, so that the nut can accommodate the screw movements without any risk of producing "hard points" conducible to jamming.

The length of said studs 13 is such that their part-spherical rolling contact end surfaces may have a relatively long radius, thus reducing inasmuch the elastic effects at the contact points. The greater resultant width of the ring increases its rigidity accordingly.

The case 2, the stop member 9 and hollow screw 10 are advantageously located within the tubular body 1, thus providing a particularly compact device.

Shaft packings or like seals 17 provided at the outlet end of screw 4 are secured to each outlet of the assembly, i.e., one within the ring screw 10 and the other within the ring screw 5 in the case illustrated in FIG. 1, and within the machine member 8a in the case of FIG. 2.

Although specific forms of embodiment of this invention have been described hereinabove and illustrated in the accompanying drawing, it will readily occur to those skilled in the art that various modifications and changes may be brought thereto without departing from the scope of the invention as set forth in the appended claims.

What is claimed as new is:

1. A floating nut mounting for a screw and nut mechanism controlling the movements of a machine-tool or like element, comprising a case containing the nut, a first member driven by the nut, a second tubular member having one end secured to said case and the other end secured to said driven member, said second tubular member including two spaced sets of four transverse slots opposed by pairs in parallel adjacent planes and shifted perpendicularly to each other between adjacent pairs so as to form between these slot planes two ring portions acting as universal flexible couplings.

2. A floating nut mounting according to claim 1, comprising adjustable tightening means interposed between said case and said other end of said second tubular member for prestressing axially said second tubular member with a force normally greater than the reaction efforts of said first member driven by the nut.

3. A floating nut mounting according to claim 2, comprising, between said tightening means and said case, a floating stop member including a ring having a pair of blind holes formed at diametrically opposed locations and shifted by 90° in relation to holes of the opposite face, said blind holes receiving bearing studs.

4. A floating nut mounting according to claim 3, wherein said bearing studs have part-circular contact ends, the diameter of which corresponds substantially to the length of the studs.

5. A floating nut mounting according to claim 4, comprising elastic rings, said rings being located for holding said bearing studs axially centered in said blind holes (11–12).

6. A floating nut mounting according to claim 3, comprising between said case and said first driven member a floating stop member including a ring having a pair of blind holes formed at diametrically opposed locations and shifted by 90° in relation to holes of the opposite face, said blind holes receiving bearing studs.

* * * * *